US012810616B2

(12) United States Patent
Bu et al.

(10) Patent No.: US 12,810,616 B2
(45) Date of Patent: Nov. 24, 2026

(54) DETERMINATION OF PERSON STATE RELATIVE TO STATIONARY OBJECT

(71) Applicants: HEWLETT-PACKARD DEVELOPMENT COMPANY, L.P., Spring, TX (US); PURDUE RESEARCH FOUNDATION, West Lafayette, IN (US)

(72) Inventors: Fan Bu, Palo Alto, CA (US); Qian Lin, Palo Alto, CA (US); Jan Allebach, West Lafayette, IN (US)

(73) Assignees: Purdue Research Foundation, West Lafayette, IN (US); Hewlett Packard Development Company, L.P., Spring, TX (US)

( * ) Notice: Subject to any disclaimer, the term of this patent is extended or adjusted under 35 U.S.C. 154(b) by 288 days.

(21) Appl. No.: 18/261,104

(22) PCT Filed: Jan. 15, 2021

(86) PCT No.: PCT/US2021/013693

§ 371 (c)(1),
(2) Date: Jul. 11, 2023

(87) PCT Pub. No.: WO2022/154806

PCT Pub. Date: Jul. 21, 2022

(65) Prior Publication Data

US 2024/0071084 A1 Feb. 29, 2024

(51) Int. Cl.

*G06V 20/00* (2022.01)
*G06T 7/73* (2017.01)

(Continued)

(52) U.S. Cl.

CPC ................ *G06V 20/52* (2022.01); *G06T 7/74* (2017.01); *G06V 10/82* (2022.01); *G06V 20/41* (2022.01);

(Continued)

(58) Field of Classification Search

None

See application file for complete search history.

(56) References Cited

U.S. PATENT DOCUMENTS 9,179,863 B2 11/2015 Brauers et al.
9,978,244 B2 5/2018 Ribble et al.

(Continued)

FOREIGN PATENT DOCUMENTS

WO 2013/015528 A1 1/2013

OTHER PUBLICATIONS

Mehta et al., VNect: Real-time 3D Human Pose Estimation with a Single RGB Camera, ACM Transactions on Graphics (TOG), vol. 36, Issue 4, Article No. 44, pp. 1-14 (Year: 2017).*

(Continued)

*Primary Examiner* — Joseph R Haley
(74) *Attorney, Agent, or Firm* — Quarles & Brady LLP

(57) ABSTRACT

A first machine learning model is applied to an image of a person and a stationary object to generate a first intermediate image including a simplified pose representation of the person in the image corresponding to a pose of the person. A simplified representation of the stationary object in the image is added to the first intermediate image. The simplified representation includes key points of the stationary object in the image. A second machine learning model is applied to a second intermediate image corresponding to the first intermediate image to determine a state of the person relative to the stationary object in the image as either a first state or a second state.

20 Claims, 6 Drawing Sheets

(51) Int. Cl.

| | |
|---|---|
| ***G06V 10/82*** | (2022.01) |
| ***G06V 20/40*** | (2022.01) |
| ***G06V 20/52*** | (2022.01) |
| ***G06V 40/10*** | (2022.01) |

(52) U.S. Cl.
CPC .... *G06V 40/10* (2022.01); *G06T 2207/10016* (2013.01); *G06T 2207/10024* (2013.01); *G06T 2207/20081* (2013.01); *G06T 2207/20084* (2013.01); *G06T 2207/20212* (2013.01); *G06T 2207/30196* (2013.01)

(56) References Cited

U.S. PATENT DOCUMENTS

| | | | | |
|---|---|---|---|---|
| 11,282,367 | B1 * | 3/2022 | Aquino | G08B 21/0476 |
| 2017/0032194 | A1 * | 2/2017 | Yu | G06V 20/46 |
| 2019/0355150 | A1 | 11/2019 | Tremblay et al. | |
| 2020/0143211 | A1 * | 5/2020 | Lai | G06V 30/19173 |
| 2020/0311402 | A1 * | 10/2020 | Zhang | G06N 3/044 |
| 2020/0410713 | A1 | 12/2020 | Auer et al. | |
| 2021/0406590 | A1 * | 12/2021 | Hu | G06N 3/044 |

OTHER PUBLICATIONS

Foubert N., et al., “Lying and sitting posture recognition and transition detection using a pressure sensor array”, Symposium on Medical Measurements, Semantic Scholar, 2012, pp. 6.

Sengto, A., et al., “Human falling detection algorithm using back propagation neural network”, BMEiCON, Semantic Scholar, 2012, pp. 5.

Viriyavit, W., et al., “Bed position classification by a neural network and bayesian network Using Noninvasive Sensors for Fall Prevention”, Hindawi, Jan. 31, 2020, pp. 14.

Zavala-Mondragon, L.A., et al., “CNN-SkelPose: a CNN-based skeleton estimation algorithm for clinical applications”, Journal of Ambient Intelligence, SpringerLink, Feb. 28, 2019, pp. 12.

* cited by examiner

DETERMINATION OF PERSON STATE RELATIVE TO STATIONARY OBJECT

BACKGROUND

In many different types of settings, the state of a person relative to a stationary object is useful information to know. For example, in hospital and other clinical and medical situations, whether a patient or other person is on or off his or her bed can signify whether the person is safe or not. If the person is not on the bed, then he or she may have fallen off, for instance, or may have wandered out of the room.

DETAILED DESCRIPTION

As noted in the background section, the state of a person relative to a stationary object may be useful information to detect. In hospital and other environments, it may not be uncommon to have a video camera in each room, so that the patients in the rooms can be remotely monitored at a nurses' station or other location. However, to detect whether a person has fallen off or otherwise has exited the bed in his or her room, personnel still have to continuously monitor the video feeds from the cameras. The responsible personnel may have many video feeds to monitor, and also may have other responsibilities, which can mean that a person who has left his or her bed may be overlooked or not quickly detected.

Existing techniques to automatedly detect the state of a person relative to a stationary object, such as whether a person is on or off a bed, may rely on video cameras that provide depth information. Such depth sensor cameras may employ infrared light to capture an image of the person and the stationary object in the infrared spectrum. However, such video cameras are generally more expensive than more ordinary cameras that capture just full-color (or black-and-white) images in the visible light spectrum, rendering such state detection techniques cost prohibitive. Moreover, whereas many existing institutions such as hospitals may already have regular video cameras in patient rooms, relatively few have depth cameras, meaning that existing cameras cannot be leveraged for such techniques.

Described herein are techniques for automatedly determining the state of a person relative to a stationary object that overcomes these issues. A first machine learning model, such as a pretrained off-the-shelf mask region-based convolutional neural network, is applied to an image of a person and a stationary object, which may be captured using a non-depth camera device, such as a full color red-green-blue digital camera device. The machine learning model generates a first intermediate image including a simplified pose representation of the person in the image corresponding to the pose of the person. A simplified representation of the stationary object in the image, including key points of the stationary object, is added to the first intermediate image.

A second machine learning model can then be applied to a second intermediate image corresponding to the first intermediate image. For example, if a first intermediate image is generated for each of a number of consecutive frames of a video feed of the person and the stationary object, the second intermediate image may be a concatenation or other combination of these first intermediate images. The second machine learning model may be a residual neural network trained on a minimum number of training images of people and the same stationary object. The second machine learning model outputs the state of the person relative to the stationary object in the image, as either a first or second state.

Figure 1:
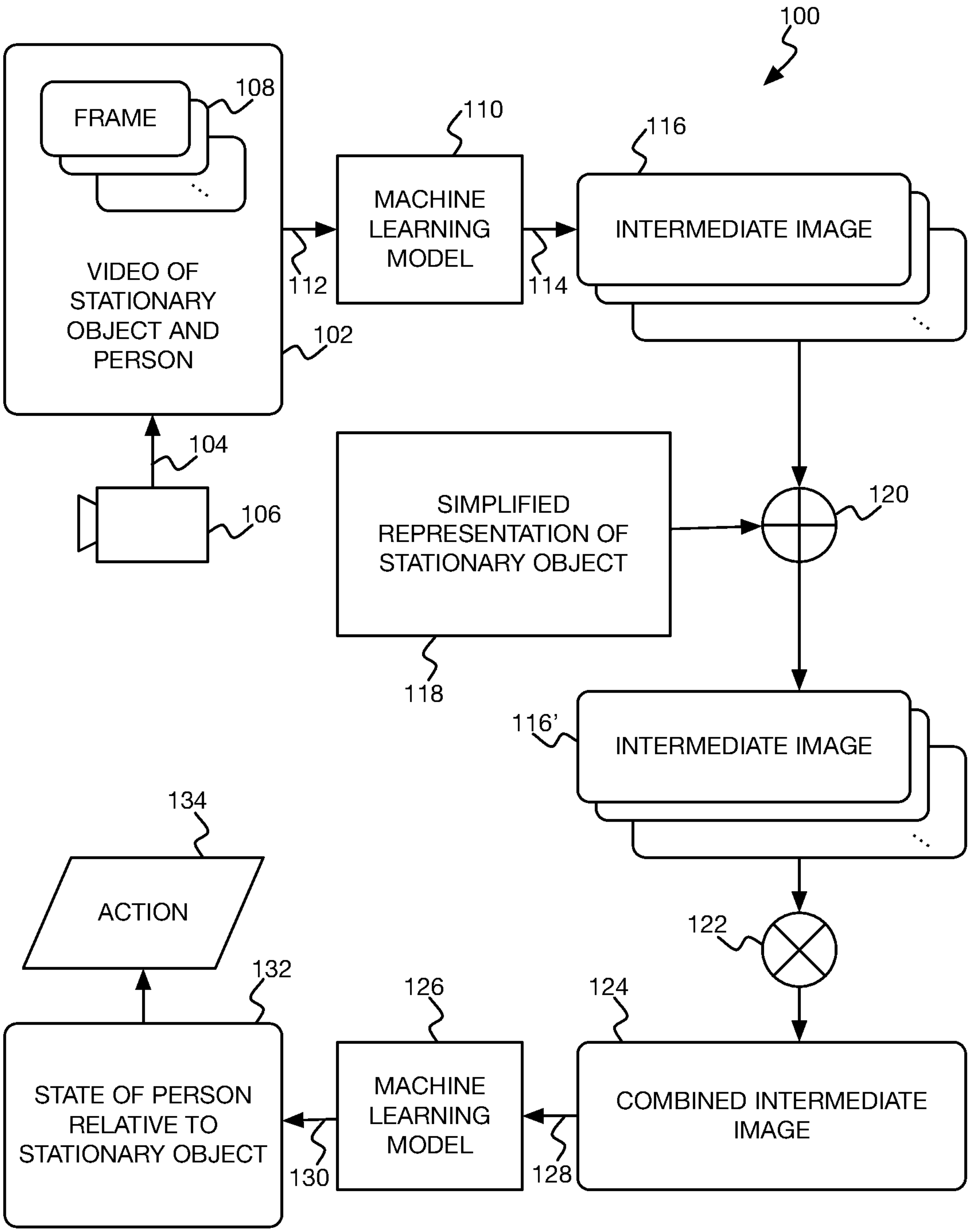
FIG. 1 is a diagram of an example architecture for determining the state of a person relative to a stationary object.

FIG. 1 shows an example architecture 100 for determining the state of a person relative to a stationary object. Video 102 of the person and the stationary object are captured (104) using a video camera 106. The video camera 106 can be a non-depth digital camera device that captures full-color images, such as red-green-blue images, in the visible light spectrum. That is, the video camera 106 may not capture depth information, such as an image in the infrared spectrum. The video 102 includes consecutive video frames 108 of the person and the stationary object. Each video frame 108 is an image of the person and the stationary object. In one implementation, every group of sixteen consecutive video frames 108 is considered.

A first machine learning model 110 is applied (112) to the frames 108, or images, of the person and the stationary object to generate (114) intermediate images 116 corresponding to the frames 108. That is, for each frame 108, a corresponding intermediate image 116 is generated. Each intermediate image 116 includes a simplified pose representation of the person in a corresponding frame 108. The simplified pose representation corresponds to the pose of the person, and may be a stick figure representation of the person's torso and limbs.

The first machine learning model 110 may be a mask region-based convolutional neural network. An example of such a machine learning model is the PyTorch-based modular object detection library known as Detectron2, which is described on the Internet web page ai.facebook.com/blog/-detectron2-a-pytorch-based-modular-object-detection-library-/, and available on the Internet at github.com/facebookresearch/detectron2. The first machine learning model 110 may thus be a pretrained, off-the-shelf machine learning model leveraged for usage herein. As such, the first machine learning model 110 does not have to be trained on images of people relative to stationary objects, and does not have to be trained on images captured using the video camera 106 that captured the video 102. The first machine learning model 110, in other words, does not have to be specific to state determination of people relative to stationary objects within images.

A simplified representation 118 of the stationary object in the frames 108 is added (120) to each intermediate image 116. The resulting intermediate images 116' therefore each include the simplified pose representation of the person in a corresponding frame 108 and the simplified representation 118 of the stationary object that is common to all the frames 108. The simplified representation 118 includes key points of the stationary object in the frames 108, such as the corner points of the stationary object. For example, the simplified representation may be a polygon having corner points corresponding to these key points.

The key points can be manually prespecified or otherwise manually identified. For example, the video camera 106 may be stationary, and the stationary object is by definition stationary. Once the video camera 106 and the object have been placed at a given location, such as in a room, both are likely at most to be infrequently moved. Therefore, the key points of the stationary object within the frames 108 may have to be manually identified just once, when the architecture 100 is first set up. A user may, for instance, select the corners of the stationary object within an initial video 102 captured by the camera 106, in order to prespecify the key points of the stationary object.

The intermediate images 116' corresponding to the frames 108 are combined (122) to generate a combined intermediate image 124, which may also be referred to as a composite image. For instance, the intermediate images 116' may be a grid (i.e., a two-dimensional array) of pixels in each of three color (e.g., red, green, and blue) channels. The intermediate images 116' can therefore be concatenated into a combined intermediate image 124 that is a tensor of n such grids in each color channel. For example, if each intermediate image 116' is a 112×112 grid of pixels in three color channels, and if there are sixteen intermediate images 116', then the combined intermediate image 124 may be a three-dimensional tensor. That is, the combined intermediate image 124 in this case is a 3×16×112×112 tensor.

A second machine learning model 126 is applied (128) to the combined intermediate image 124 to determine the state 132 of the person relative to the stationary object in the video 102 captured by the camera 106. The second machine learning model 126 can be a residual neural network, an example of which is described in detail later in the detailed description. The second machine learning model 126 is specific to person state relative to stationary object determination. The second machine learning model 126 may be trained using training videos of people and stationary objects of the same type as the stationary object captured in the video 102.

In one implementation, the second machine learning model 126 may be trained for the specific stationary object captured in the video 102 by the camera 106 and that has the prespecified simplified representation 118. For example, once the camera 106 and the stationary object have been placed at a given location and the simplified representation of the stationary object specified, the second machine learning model 126 may be trained using labeled training videos captured using the video camera 106. The person in each training video may not be the same, and may not be the same as the person in the video 102.

Furthermore, the stationary object is the same type of object in each training video, and is the same type of object as the stationary object in the video 102. However, the actual object in each training video may differ, and may differ from the actual object in the video 102. For example, the type of stationary object may be a bed. The actual bed that is used in each training video, therefore, may be the same or different, and may be the same or different as the actual bed in the video 102.

In this implementation, the second machine learning model 126 (but not the first machine learning model 110, which as noted may be an off-the-shelf pretrained model) may be trained using training videos captured when the architecture 100 is first set up. As to the specific example of the second machine learning model 126 described in detail below, it has been found that a relatively small number of training images (e.g., video frames) is sufficient for the second machine learning model 126 to have accuracy greater than 87% in correctly determining the state of a person relative to a stationary object. Specifically, fewer than 100 labeled training videos may be sufficient in this respect, and the running length of the training videos in total may be about 36.5 minutes. Each video frame may be considered a training image, such that at 30 frames per second, there are fewer than 66,000 training images. By comparison, existing machine learning models may require more than 1,000,000, or even 2,000,000, training images to have such accuracy.

The state 132 of the person relative to the stationary object in the video 102 captured by the camera 106 can be a first state of the person relative to the stationary object or a second state of the person relative to the stationary object. For example, in the case of a bed, the first state may be that the person is on the bed, and the second state may be that the person is not on (i.e., is off or has exited) the bed. When the second machine learning model 126 is trained, training images of people in both states relative to the stationary object are therefore used. Each training image is labeled as to the state of the person relative to the stationary object.

In the architecture 100, an action 134 can be performed depending on whether the determined state 132 of the person relative to the stationary object in the video 102 is the first state or the second state. For example, in the case of detecting whether or not a person is on a bed, appropriate personnel may be notified if the second machine learning model 126 detects the person's state as not being on the bed. Such personnel may include those who are responsible for the care of the person in question, or personnel who are detected as being inside the room in which the bed is located or closest to this room.

Similarly, if the video 102 captured by the video camera 106 is displayed at a remote location such as a nurses' station, an audible or visual alarm may sound at the station to draw the attention of any monitoring personnel. As another example, responsive to determining that the person is off the bed, the door to the room in which the bed is located may be automatically locked in such a way to prevent the person from leaving the room, but not prevent other people from entering the room. Therefore, a person who is in a potentially confused or impaired state is unable to wander away from the room and become lost.

The architecture 100 has been described in relation to frames 108 of video 102 captured by the camera 106. In such instance, an intermediate image 116 is generated for each frame 108 using the first machine learning model 110. The resulting intermediate image 116' for the frames 108, to which the simplified representation 118 of the stationary object has been added, are combined into a combined intermediate image 124, such as a tensor. On the basis of the combined intermediate image 124, the second machine learning model 126 determines the state 132 of the person in the video 102 relative to the stationary object in the video 102.

However, the architecture 100 can also be performed in relation to one image, such as a single video frame, of a person and a stationary object that may be captured the camera 106 or by a different camera. An intermediate image 116 is again generated for the image using the first machine learning model 110, to which the simplified representation 118 of the stationary object is added to yield an intermediate image 116'. In this case, since there is just one intermediate image 116', the combined intermediate image 124 is in effect the intermediate image 116' itself. That is, on the basis of the intermediate image 116', the second machine learning model 126 determines the state 132 of the person in the image relative to the stationary object in the image.

More generally, it can be said that the one or multiple intermediate images 116 (and 116') are first intermediate images, and the combined intermediate image 124 is a second intermediate image corresponding to the first intermediate image(s). In the case of video 102 having multiple frames 108 of a person and a stationary object, the second intermediate image corresponds to multiple first intermediate images in that it is a combination (e.g., a concatenation) of the first intermediate images. In the case of a single image of a person and a secondary object, the second intermediate image corresponds to the first intermediate image in that it is the first intermediate image.

Figure 2A:
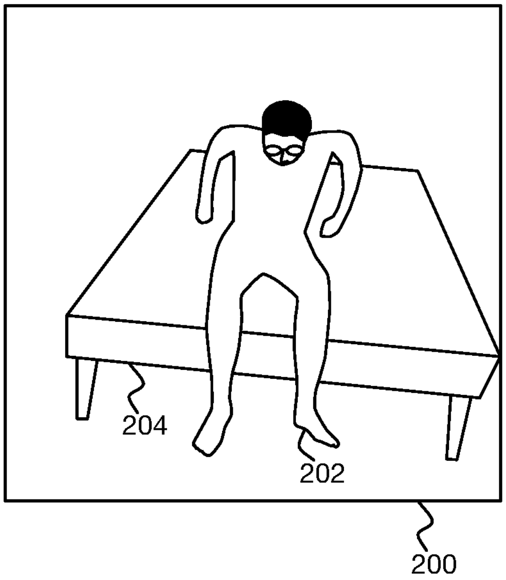
FIG. 2A is a diagram of an example image of a person and a stationary object.

FIG. 2A shows an example image 200 in relation to which the architecture 100 can determine person state relative to a stationary object. The image 200 may be a frame 108 of the video 102 captured by the video camera 106. The image 200 includes a person 202 and a stationary object 204, specifically a bed. The state of the person 202 relative to the stationary object 204 in the image 200 is that the person 202 is on (as opposed to off or having exited) the bed.

Figure 2B:
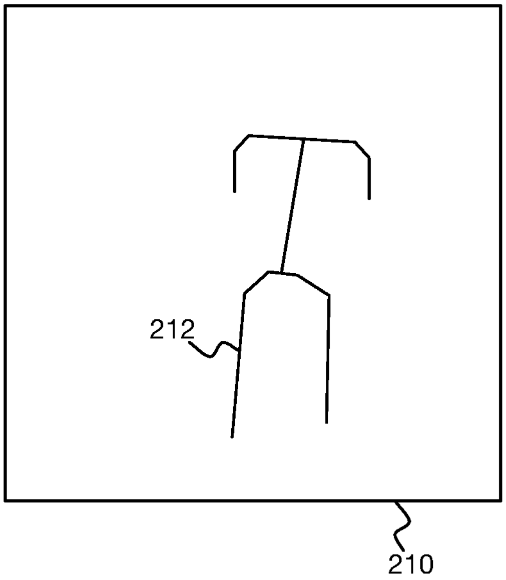
FIG. 2B is a diagram of an example intermediate image of a simplified pose representation of the person in the image of FIG. 2A.

FIG. 2B shows an example intermediate image 210 that the first machine learning model 110 may generate from the example image 200. The intermediate image 210 includes a simplified pose representation 212 of the person 202 in the image 200. The simplified pose representation 212 of the intermediate image 210 corresponds to the pose of the person 202 in the image 200, in the form of a stick figure representation of the torso and limbs of the person 202.

Figure 2C:
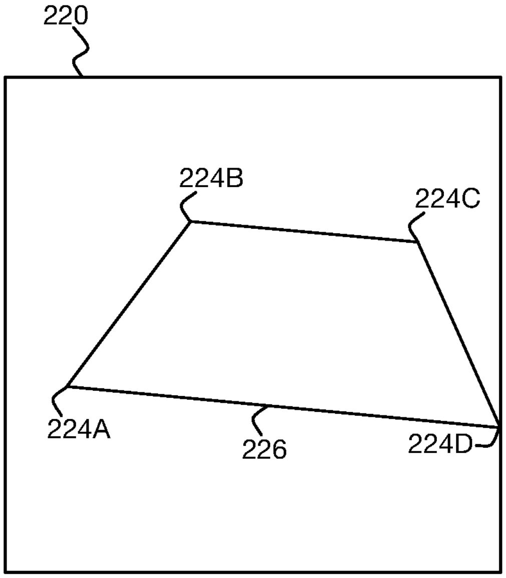
FIG. 2C is a diagram of an example simplified representation of key points of the stationary object in the image of FIG. 2A.

FIG. 2C shows an example simplified representation 220 of the stationary object 204 in the example image 200. The simplified representation 220 includes key points 224A, 224B, 224C, and 224D, which are collectively referred to as the key points 224, of the stationary object 204 in the image 200. The simplified representation 220 thus can include a polygon, such as a quadrilateral in the example of FIG. 2C, having corner points corresponding to the key points 224.

Figure 2D:
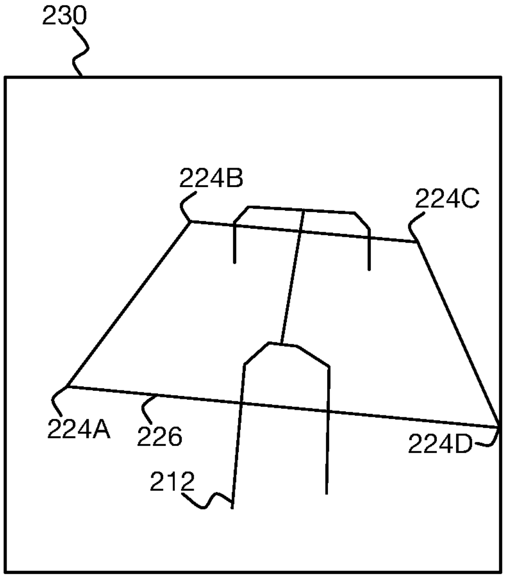
FIG. 2D is a diagram of the example intermediate image of FIG. 2B to which the example simplified representation of FIG. 2C has been added.

FIG. 2D shows an example intermediate image 230, which is the intermediate image 210 to which the simplified representation 220 has been added. The intermediate image 230 thus includes the simplified pose representation 212 of the person 202 in the image 200, as well as the polygon 226 have corner points corresponding to the key points 224 of the stationary object 204 in the image 200. The second machine learning model 126 is applied to the intermediate image 230, or to a combination of multiple such intermediate images 230 of different video frames, to determine the state of the person 202 relative to the stationary object 204.

Figure 3:
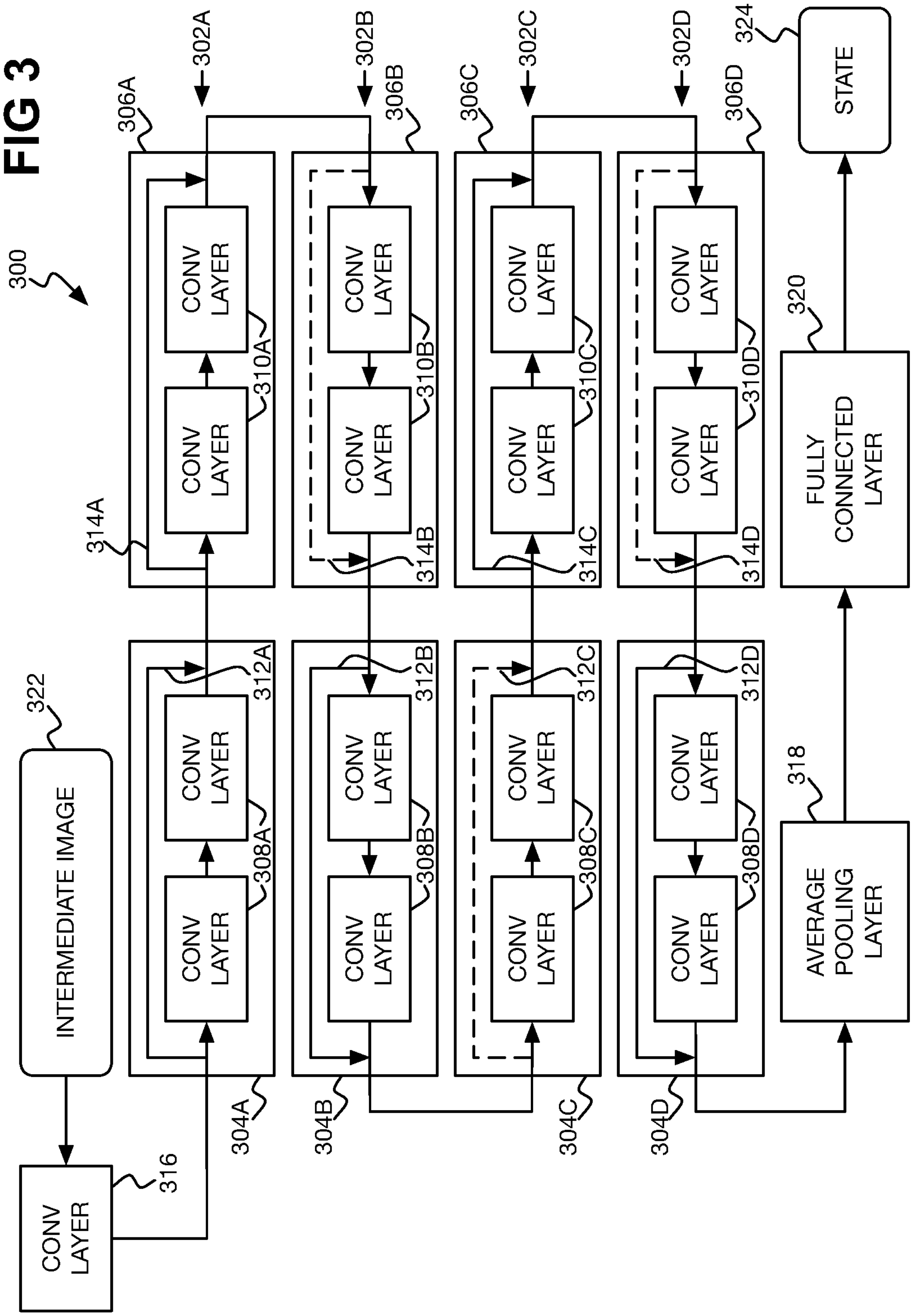
FIG. 3 is a diagram of an example machine learning model for determining the state of a person relative to a stationary object from an intermediate image of a simplified pose representation of the person and a simplified representation of the stationary object.

FIG. 3 shows an example machine learning model 300 for determine the state of a person relative to a stationary object from an intermediate image of a simplified pose representation of the person and a simplified representation of the stationary object. The machine learning model 300 can implement the second machine learning model 126 in the architecture 100. The machine learning model 300 is specifically a residual convolutional neural network.

The machine learning model 300 therefore include serially connected pairs 302A, 302B, 302C, and 302D of residual blocks, which are collectively referred to as the serially connected pairs 302 of residual blocks. Each pair 302 of residual blocks includes first and second residual blocks. Specifically, the pairs 302A, 302B, 302C, and 302D respectively include first residual blocks 304A, 304B, 304C, and 304D, which are collectively referred to as the first residual blocks 304, and second residual blocks 306A, 306B, 306C, and 306D, which are collectively referred to as the second residual blocks 306.

Each residual block 304 and 306 includes multiple convolutional layers. Specifically, the first residual blocks 304A, 304B, 304C, and 304D respectively include convolutional layers 308A, 308B, 308C, and 308D, which are collectively referred to as the convolutional layers 308, and which abstract their respective inputs. Similarly, the second residual blocks 306A, 306B, 306C, and 306D respectively include convolutional layers 310A, 310B, 310C, and 310D, which are collectively referred to as the convolutional layers 310, and which likewise abstract their respective inputs.

Each residual block 304 and 306 also includes a skip connection connecting the input of the residual block 304 or 306 in question to the output of this residual block. Specifically, the first residual blocks 304A, 304B, 304C, and 304D respectively include skip connections 312A, 312B, 312C, and 312D, which are collectively referred to as the skip connections 312. Similarly, the second residual blocks 306A, 306B, 306C, and 306D respectively include skip connections 314A, 314B, 314C, and 314D, which are collectively referred to as the skip connections 314.

The machine learning model 300 also includes an initial convolutional layer 316 connected to the first pair 302A of residual blocks. The machine learning model 300 further includes an average pooling layer 318 connected to the last pair 302D of residual blocks, and a fully connected layer 320 connected to the average pooling layer 318. An intermediate image 322, such as the combined intermediate image 124 in FIG. 1, is thus input to the machine learning model 300, and the state 324 of the person relative to the stationary object, such as the state 132 in FIG. 1, is output by the machine learning model 300.

For instance, the intermediate image 322 may be a 3×16×112×112 tensor that is input to the convolutional layer 316 having a kernel size of 3×7×7 with pooling stride of 1×2, which results in a tensor of size 64×16×56×56. This tensor is input to the residual block 304A having convolutional layers 308A of the same kernel size, such as 3×7×7, and that output a square image of size 56×56. Specifically, the tensor is input to the first convolutional layer 308A of the residual block 304A, and further, via the skip connection 312A, to the first convolutional layer 310A of the residual block 306A. The tensor is therefore added to the output of the second convolutional layer 308A of the residual block 304A, resulting in a tensor of size 64×16×56×56.

This tensor is input to the residual block 306A having convolutional layers 310A of the same kernel size as that of the convolutional layers 308A, or 3×7×7, and that output a square image of the same size 56×56. Specifically, the tensor is input to the first convolutional layer 310A of the residual block 306A, and further, via the skip connection 314A, to the first convolutional layer 310B of the residual block 306B. The tensor is therefore added to the output of the second convolutional layer 310A of the residual block 306A, again resulting in a tensor of size 64×16×56×56.

This tensor is input to the residual block 306B having convolutional layers 310B of the same, smaller kernel size of 3×3×3, and that output a larger square image of size 128×128. Specifically, the tensor is input to the first convolutional layer 310B of the residual block 306B, and further, via the skip connection 314B, to the first convolutional layer 308B of the residual block 304B. However, because the image increases in size in the residual block 306B, the skip connection 314B downsamples the input tensor, such as via a three-dimensional convolutional layer having a kernel size of 1×1 and a stride of two. This downsampling is indicated in FIG. 3 via the skip connection 314B being dashed. The downsampled tensor is thus added to the output of the second convolutional layer 310B of the residual block 306B, resulting in a tensor of size 128×8×28×28.

This tensor is input to the residual block 304B having convolutional layers 308B of the same kernel size as that of the convolutional layers 310B, or 3×3×3, and that output a square image of the same size 128×128. Specifically, the tensor is input to the first convolutional layer 308B of the residual block 304B, and further, via the skip connection 312B, to the first convolutional layer 308C of the residual block 304C. The tensor is therefore added to the output of the second convolutional layer 308B of the residual block 304B, again resulting in a tensor of size 128×8×28×28.

This tensor is input to the residual block 304C having convolutional layers 308C of the same kernel size of 3×3×3, and that output a larger square image of size 256×256. Specifically, the tensor is input to the first convolutional layer 308C of the residual block 304C, and further, via the skip connection 312C, to the first convolutional layer 310C of the residual block 306C. Because the image increases in size in the residual block 304C, the skip connection 312C downsamples the input tensor, such as in the same way as the skip connection 314B does, and therefore is dashed in FIG. 3. This downsampled tensor is added to the output of the second convolutional layer 308C of the residual block 304C, resulting in a tensor of size 256×4×14×14.

This tensor is input to the residual block 306C having convolutional layers 310C of the same kernel size of 3×3×3, and that output a square image of the same size 256×256. Specifically, the tensor is input to the first convolutional layer 310C of the residual block 306C, and further, via the skip connection 314C, to the first convolutional layer 310D of the residual block 306D. The tensor is therefore added to the output of the second convolutional layer 310C of the residual block 306C, again resulting in a tensor of size 256×4×14×14.

This tensor is input to the residual block 306D having convolutional layers 310D of the same kernel size 3×3×3, and that output a larger square image of size 512×512. Specifically, the tensor is input to the first convolutional layer 310D of the residual block 306D, and further, via the skip connection 314D, to the first convolutional layer 308D of the residual block 304D. Because the image increases in size in the residual block 306D, the skip connection 314D downsamples the input tensor, such as in the same way as the skip connection 314B does, and thus is dashed in FIG. 3. This downsampled tensor is added to the output of the second convolutional layer 310D of the residual block 306D, resulting in a tensor of size 512×2×7×7.

This tensor is input to the residual block 304D having convolutional layers 308D of the same kernel size 3×3×3, and that output a square image of the same size 512×512. Specifically, the tensor is input to the first convolutional layer 308D of the residual block 304D, and further, via the skip connection 312D, to the average pooling layer 318. The tensor is therefore added to the output of the second convolutional layer 308D of the residual block 304D, again resulting in a tensor of size 512×2×7×7.

The average pooling layer 318 averages this tensor to reduce dimensionality and size without reducing the number of connections, outputting a tensor of size 512×1×1×1. This tensor is passed through the fully connected layer 320 for flattening. The output of the fully connected layer 320 is therefore the state 324 of the person relative to the stationary object in the image or video frames on which basis the intermediate image 322 was generated.

The described machine learning model 300 has been shown to have an accuracy of greater than 87% in correctly determining the state of a person relative to a stationary object within an image or video frames. Moreover, just a relatively small number of training images having to be used to train the machine learning model 300 in this respect, when used in the context of the architecture 100. As noted above, for instance, fewer than 66,000 training images are sufficient for the machine learning model 300 to have state determination accuracy greater than 87%.

Figure 4:
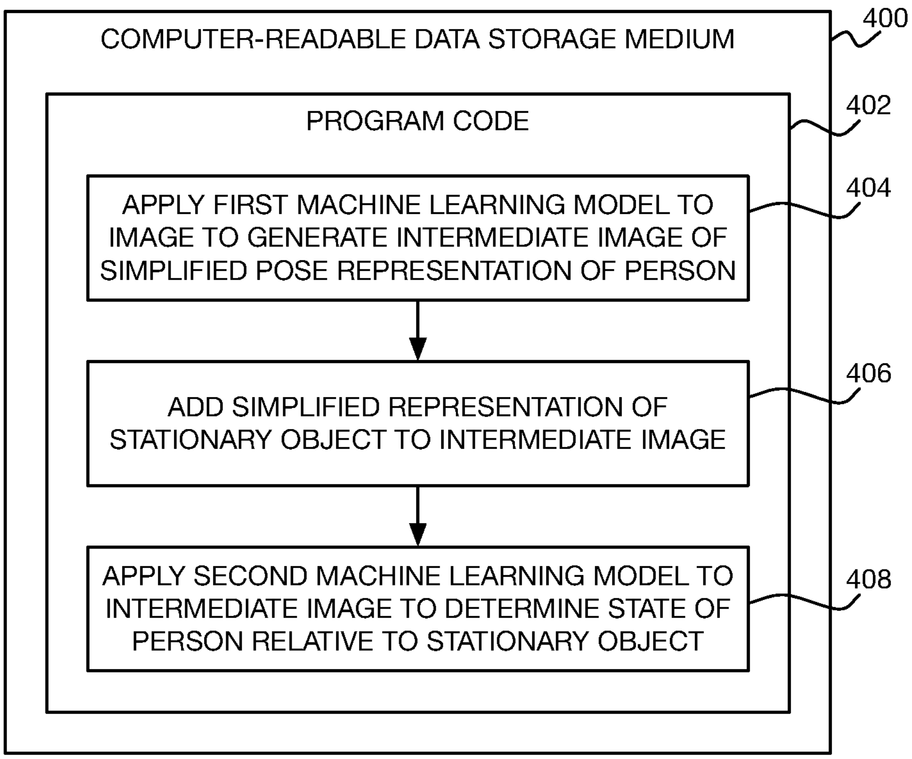
FIG. 4 is a diagram of an example non-transitory computer-readable data storage medium.

FIG. 4 shows an example non-transitory computer-readable data storage medium 400 storing program code 402 executable by a processor to perform processing. The processing includes applying a first machine learning model to an image of a person and a stationary object to generate a first intermediate image including a simplified pose representation of the person in the image corresponding to a pose of the person (404). The processing includes adding to the first intermediate image a simplified representation of the stationary object in the image, the simplified representation including key points of the stationary object in the image (406). The processing includes applying a second machine learning model to a second intermediate image corresponding to the first intermediate image to determine a state of the person relative to the stationary object in the image as either a first state or a second state (408).

Figure 5:
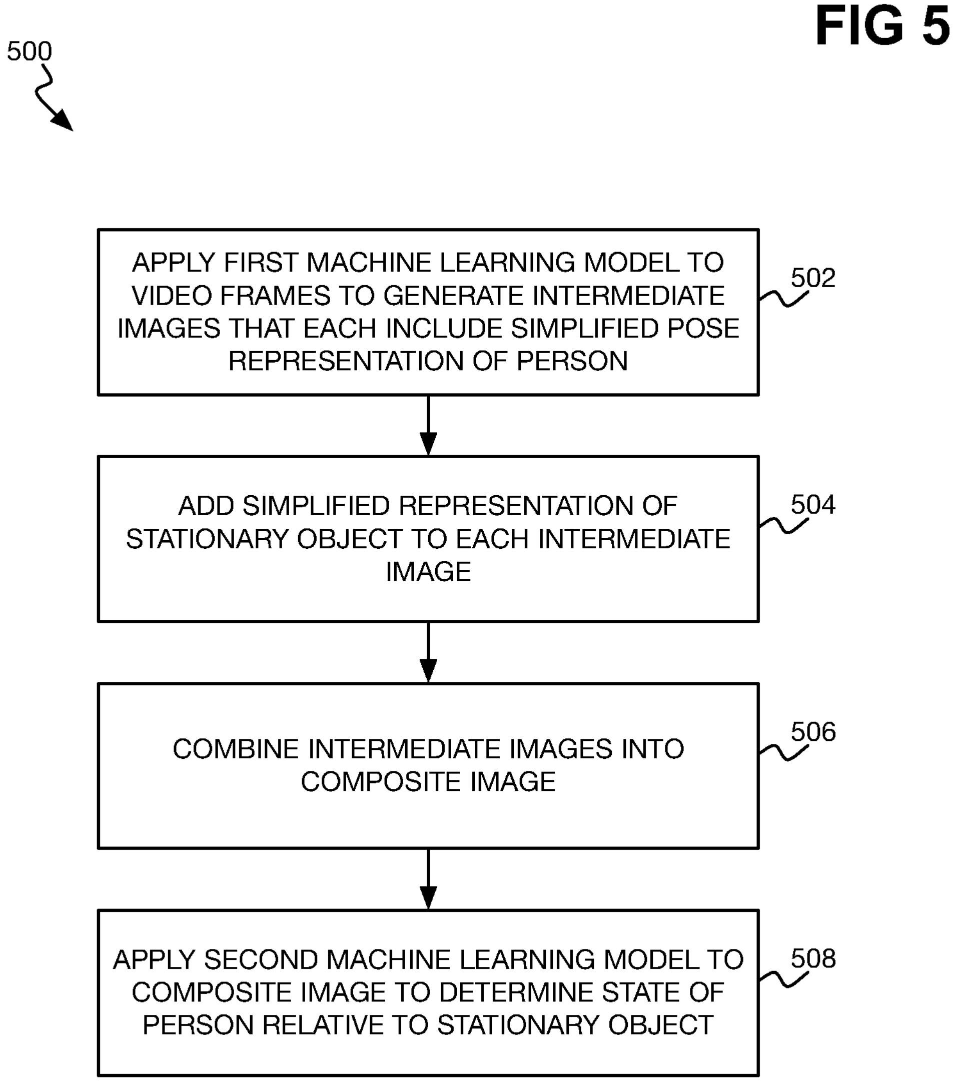
FIG. 5 is a flowchart of an example method.

FIG. 5 shows an example method 500. The method 500 may be implemented as program code stored on a non-transitory computer-readable data storage medium and executed by a processor. The method 500 includes applying a first machine learning model to frames of video of a person and a stationary object to generate intermediate images that each include a simplified pose representation of the person in a corresponding frame (502). The method 500 includes adding to each intermediate image a simplified representation of the stationary object in the corresponding frame (504), and combining the intermediate images into a composite image (506). The method 500 includes applying a second machine learning model to the composite image to determine a state of the person relative to the stationary object in the video as either a first state or a second state (508).

Figure 6:
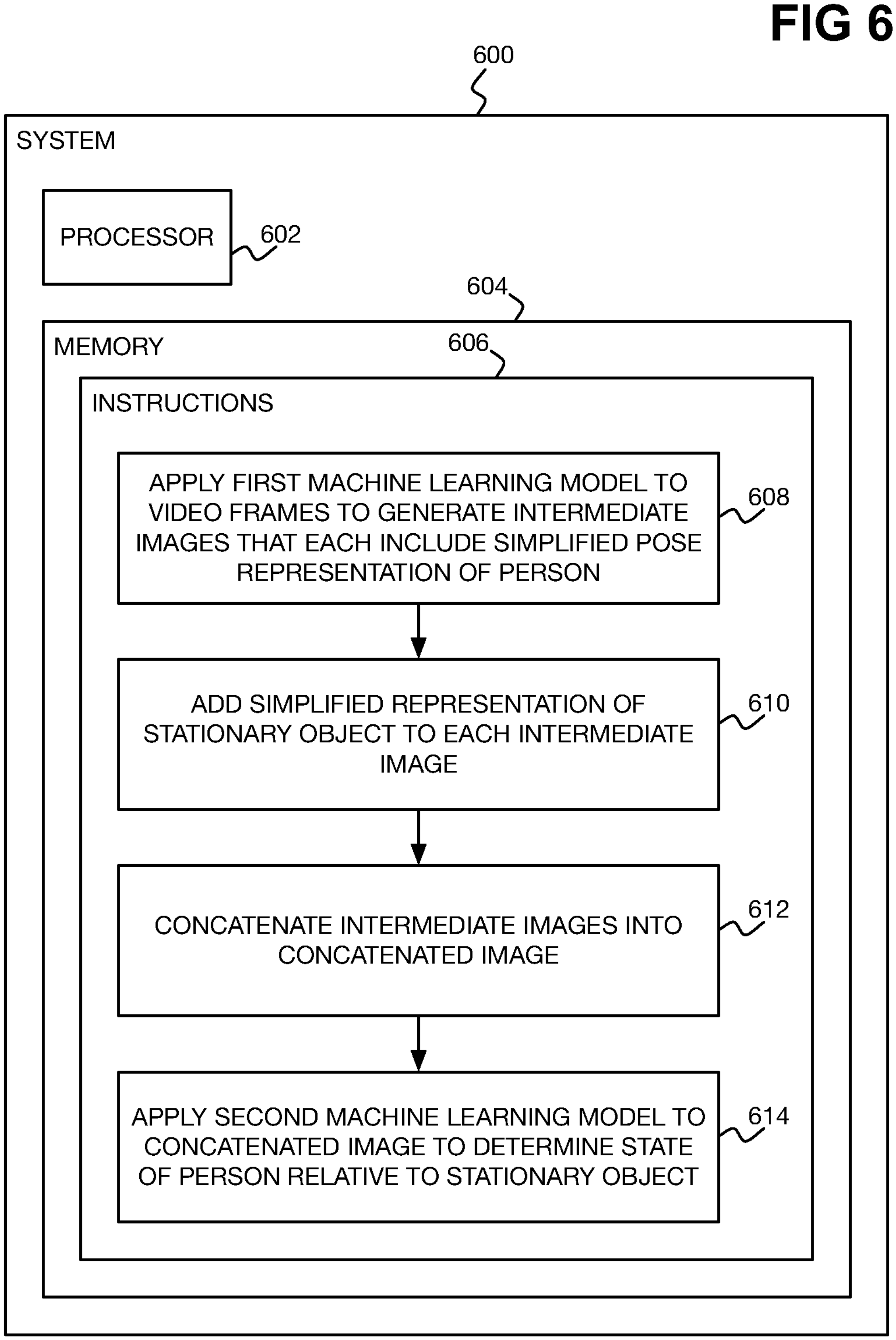
FIG. 6 is a diagram of an example system.

FIG. 6 shows an example system 600. The system 600 may be implemented as a computing device. The system 600 includes a processor 602 and a memory 604 storing instructions 606. The instructions 606 are executable by the processor 602 to apply a first machine learning model to frames of video of a person and a stationary object to generate intermediate images that each include a simplified pose representation of the person in a corresponding frame (608). The instructions 606 are executable by the processor 602 to add to each intermediate image a simplified representation of the stationary object in the corresponding frame (610), and concatenate the intermediate images into a concatenated image (612). The instructions 606 are executable by the processor 602 to apply a second machine learning model to the concatenated image to determine a state of the person relative to the stationary object in the video as either a first state or a second state (614).

Techniques have been described herein for determining the state of a person relative to a stationary object in an automated manner. A pretrained, off-the-shelf machine learning model can be used to generate an intermediate image of a simplified pose representation of the person, to which a simplified representation of the stationary object can then be added. Another machine learning model, an example of which has been delineated herein and which can be trained on a relatively small number of training images while still providing high accuracy, can then be applied to the resultant intermediate image to output the state determination of the person relative to the stationary object.

We claim:

1. A non-transitory computer-readable data storage medium storing program code executable by a processor to perform processing comprising:

applying a first machine learning model to an image of a person and a stationary object to generate a first intermediate image including a simplified pose representation of the person in the image corresponding to a pose of the person;

adding to the first intermediate image a simplified representation of the stationary object in the image, the simplified representation including a plurality of key points of the stationary object in the image;

applying a second machine learning model to a second intermediate image corresponding to the first intermediate image to determine a state of the person relative to the stationary object in the image as either a first state or a second state, wherein the second machine learning model is a residual neural network trained on a minimum number of training images of people and a specific stationary object, and the second machine learning model outputs the state of the person relative to the specific stationary object; and performing an action depending on whether the determined state of the person relative to the stationary object in the image is the first state or the second state.

2. The non-transitory computer-readable data storage medium of claim 1, wherein the processing further comprises:

acquiring the image of the person and the stationary object using a non-depth, red-green-blue digital camera device.

3. The non-transitory computer-readable data storage medium of claim 1, wherein the second intermediate image is the first intermediate image.

4. The non-transitory computer-readable data storage medium of claim 1, wherein the image is one of a plurality of frames of video of the person and the stationary object, wherein the first intermediate image is generated for each frame and the simplified representation of the stationary object is added to the first intermediate image generated for each frame, and wherein the processing further comprises:

generating the second intermediate image by combining the first intermediate image generated for each frame.

5. The non-transitory computer-readable data storage medium of claim 1, wherein the simplified pose representation comprises a stick figure representation of a torso and limbs of the person.

6. The non-transitory computer-readable data storage medium of claim 1, wherein the key points of the stationary object in the image are prespecified, and the simplified representation comprises a polygon having corner points corresponding to the prespecified key points.

7. The non-transitory computer-readable data storage medium of claim 1, wherein the first machine learning model comprises a mask region-based convolutional neural network.

8. The non-transitory computer-readable data storage medium of claim 7, wherein the mask region-based convolutional neural network is pretrained and is not specific to state determination of people relative to stationary objects within images.

9. The non-transitory computer-readable data storage medium of claim 1, wherein the residual neural network comprises:

a plurality of serially connected pairs of residual blocks, each pair of residual blocks comprising first and second residual blocks that each comprise a plurality of convolutional layers, the convolutional layers of the first and second residual blocks having an identical kernel size; and a plurality of skip connections, each skip connection connecting an input of a corresponding residual block to an output of the corresponding residual block to skip the convolutional layers of the corresponding residual block.

10. The non-transitory computer-readable data storage medium of claim 9, wherein the residual neural network further comprises:

an initial convolutional layer connected to a first pair of residual blocks;

an average pooling layer connected to a last pair of residual blocks; and a fully connected layer connected to the average pooling layer.

11. The non-transitory computer-readable data storage medium of claim 1, wherein the stationary object comprises a bed, the first state is the person on the bed, and the second state is the person off the bed.

12. The non-transitory computer-readable data storage medium of claim 1, wherein the second state determines that the person is away from the stationary object.

13. The non-transitory computer-readable data storage medium of claim 12, wherein the determination of a person in the second state causes the second machine learning model to:

notify personnel of the state of the person.

14. The non-transitory computer-readable data storage medium of claim 13, wherein the notifying personnel includes an audible or visual alarm.

15. The non-transitory computer-readable data storage medium of claim 2, wherein the second machine learning model is trained using training videos captured using the non-depth, red-green-blue digital camera device.

16. A method comprising:

applying a first machine learning model to a plurality of frames of video of a person and a stationary object to generate a plurality of intermediate images that each include a simplified pose representation of the person in a corresponding frame;

adding to each intermediate image a simplified representation of the stationary object in the corresponding frame;

combining the intermediate images into a composite image;

applying a second machine learning model to the composite image to determine a state of the person relative to the stationary object in the video as either a first state or a second state, wherein the second machine learning model is a residual neural network trained on a minimum number of training images of people and a specific stationary object, and the second machine learning model outputs the state of the person relative to the specific stationary object; and performing an action depending on whether the determined state of the person relative to the stationary object in the video is the first state or the second state.

17. The method of claim 16, wherein the second machine learning model is trained using labeled training videos captured using a video camera once the video camera and the stationary object have been placed at a given location and a simplified representation of the stationary object has been specified.

18. The method of claim 16, wherein the second machine learning model is trained on less than 100 labeled training videos with greater than 87 percent accuracy.

19. A system comprising:

a processor; and a memory storing instructions executable by the processor to:

apply a first machine learning model to a plurality of frames of video of a person and a stationary object to generate a plurality of intermediate images that each include a simplified pose representation of the person in a corresponding frame;

add to each intermediate image a simplified representation of the stationary object in the corresponding frame;

concatenate the intermediate images into a concatenated image;

apply a second machine learning model to the concatenated image to determine a state of the person relative to the stationary object in the video as either a first state or a second state, wherein the second machine learning model is a residual neural network trained on a minimum number of training images of people and a specific stationary object, and the second machine learning model outputs the state of the person relative to the specific stationary object; and perform an action depending on whether the determined state of the person relative to the stationary object in the video is the first state or the second state.

20. A non-transitory computer-readable data storage medium storing program code executable by a processor to perform processing comprising:

applying a first machine learning model to an image of a person and a stationary object to generate a first intermediate image including a simplified pose representation of the person in the image corresponding to a pose of the person;

adding to the first intermediate image a simplified representation of the stationary object in the image, the simplified representation including a plurality of key points of the stationary object in the image;

applying a second machine learning model to a second intermediate image corresponding to the first intermediate image to determine a state of the person relative to the stationary object in the image as either a first state or a second state, wherein the second state determines that the person is away from the stationary object; and performing an action depending on whether the determined state of the person relative to the stationary object in the image is the first state or the second state, wherein the determination of a person in the second state causes the second machine learning model to notify personnel of the state of the person, and wherein the second machine learning model detects a room within which the person is located and automatically locks a door of the room.

* * * * *